United States Patent
Gentry et al.

(10) Patent No.: US 11,961,024 B1
(45) Date of Patent: Apr. 16, 2024

(54) AUTOMATED STAFFING ALLOCATION AND SCHEDULING

(71) Applicant: Insight Direct USA, Inc., Chandler, AZ (US)

(72) Inventors: Meagan Leigh Gentry, Wake Forest, NC (US); Jonathan Raynor, Clayton, NC (US)

(73) Assignee: Insight Direct USA, Inc., Chandler, AZ (US)

( * ) Notice: Subject to any disclaimer, the term of this patent is extended or adjusted under 35 U.S.C. 154(b) by 0 days.

(21) Appl. No.: 18/109,643

(22) Filed: Feb. 14, 2023

(51) Int. Cl.
 *G06Q 10/0631* (2023.01)
(52) U.S. Cl.
 CPC .................. *G06Q 10/063116* (2013.01)
(58) Field of Classification Search
 None
 See application file for complete search history.

(56) References Cited

U.S. PATENT DOCUMENTS

| 8,562,276 | B2 | 10/2013 | Helmner |
| 8,688,496 | B1 * | 4/2014 | Tansupaswatdikul ........... G06Q 10/08 705/5 |
| 10,607,292 | B2 | 3/2020 | Levine et al. |
| 10,777,306 | B1 * | 9/2020 | LaBorde ............... G06N 3/088 |
| 10,780,980 | B2 | 9/2020 | Riedel et al. |
| 11,010,854 | B2 | 5/2021 | Cheikh et al. |
| 11,062,406 | B2 | 7/2021 | Savian |
| 11,136,140 | B2 | 10/2021 | Heafitz et al. |
| 11,189,155 | B2 | 11/2021 | Malinofsky |

(Continued)

FOREIGN PATENT DOCUMENTS

| CN | 101239658 B | 3/2013 |
| CN | 109409626 A | 3/2019 |

(Continued)

OTHER PUBLICATIONS

C. Tan, "Bidirectional LSTM Model in Predicting Satisfaction Level of Passengers on Airline Service," 2021 2nd International Conference on Artificial Intelligence and Computer Engineering (ICAICE), Hangzhou, China, 2021, pp. 525-531, doi: 10.1109/ICAICE54393.2021.00107 (Year: 2021).*

(Continued)

*Primary Examiner* — Shelby A Turner
(74) *Attorney, Agent, or Firm* — Kinney & Lange, P.A.

(57) ABSTRACT

A method of automatically generating baggage driver staffing recommendations including receiving a first set of flight parameters for a first flight, creating a first predictive staffing model for the first flight by simulating missed bag quantities for a range of driver quantities using a first computer-implemented machine learning model and the first set of flight parameters, and automatically generating a first recommended driver quantity predicted to result in a quantity of missed bags using the first predictive staffing model and a threshold quantity of missed bags. The missed bag quantities are simulated using a simulator, the first computer-implemented machine learning model is configured to relate driver quantities and flight parameters to expected missed bag quantities, and the first predictive staffing model relates predicted quantities of missed bags to quantities of staffed drivers.

14 Claims, 4 Drawing Sheets

(56) References Cited

U.S. PATENT DOCUMENTS

| | | | |
|---|---|---|---|
| 11,216,775 | B1 | 1/2022 | Ford et al. |
| 11,355,223 | B1 | 6/2022 | Laborde |
| 11,401,049 | B2 | 8/2022 | Kim et al. |
| 11,461,756 | B2 | 10/2022 | Miyata |
| 11,479,370 | B2 | 10/2022 | Gonzalez Parra et al. |
| 11,507,922 | B1 | 11/2022 | Medidhi et al. |
| 11,508,186 | B2 | 11/2022 | Maruyama |
| 11,508,225 | B2 | 11/2022 | Shakedd et al. |
| 2004/0193473 | A1* | 9/2004 | Robertson |
| 2005/0010460 | A1* | 1/2005 | Mizoguchi ............. G06Q 10/06 703/16 |
| 2005/0096962 | A1* | 5/2005 | Narasimhan |
| 2007/0219816 | A1 | 9/2007 | Van et al. |
| 2019/0057327 | A1* | 2/2019 | Arguello |
| 2021/0002088 | A1 | 1/2021 | Kobayashi et al. |
| 2021/0024227 | A1* | 1/2021 | Ohta |
| 2021/0035029 | A1 | 2/2021 | Vaculin et al. |
| 2021/0174285 | A1* | 6/2021 | Iwabuchi ........ G06Q 10/063116 |
| 2022/0027837 | A1* | 1/2022 | D'Attilio |
| 2022/0188910 | A1* | 6/2022 | Jin |

FOREIGN PATENT DOCUMENTS

| | | | |
|---|---|---|---|
| CN | 109858437 | A | 6/2019 |
| CN | 110378537 | A * | 10/2019 |
| CN | 110378537 | A | 10/2019 |
| CN | 210253180 | U | 4/2020 |
| CN | 111216919 | A | 6/2020 |
| CN | 109714701 | B | 12/2020 |
| CN | 109242058 | B | 8/2021 |
| CN | 214235065 | U | 9/2021 |
| CN | 214356628 | U | 10/2021 |
| CN | 112374119 | B | 12/2021 |
| CN | 113822555 | A | 12/2021 |
| CN | 215247886 | U | 12/2021 |
| CN | 215323332 | U | 12/2021 |
| CN | 215324932 | U | 12/2021 |
| CN | 215438438 | U | 1/2022 |
| CN | 113743965 | B | 3/2022 |
| CN | 215997595 | U | 3/2022 |
| CN | 216357105 | U | 4/2022 |
| CN | 114537395 | A | 5/2022 |
| CN | 216527248 | U | 5/2022 |
| CN | 216835784 | U | 6/2022 |
| CN | 216848777 | U | 6/2022 |
| CN | 216996187 | U | 7/2022 |
| CN | 112093070 | B | 8/2022 |
| CN | 217374572 | U | 9/2022 |
| CN | 112288932 | B | 11/2022 |
| CN | 114596530 | B | 11/2022 |
| CN | 115329683 | A | 11/2022 |
| CN | 217730887 | U | 11/2022 |
| CN | 217838310 | U | 11/2022 |
| CN | 217861356 | U | 11/2022 |
| CN | 217879639 | U | 11/2022 |
| CN | 217880374 | U | 11/2022 |
| DE | 102011080490 | A1 | 3/2012 |
| DE | 102019124984 | B4 | 11/2022 |
| DE | 102020000834 | B4 | 11/2022 |
| DE | 102021111838 | B4 | 11/2022 |
| EP | 1764304 | B1 | 12/2013 |
| IN | 202041039316 | A | 3/2022 |
| IN | 216971202 | U | 7/2022 |
| IN | 217866851 | U | 11/2022 |
| JP | 6550233 | B2 | 7/2019 |
| JP | 2020514173 | A | 5/2020 |
| JP | 6798382 | B2 | 11/2020 |
| KR | 101974463 | B1 | 5/2019 |
| KR | 102402417 | B1 | 5/2022 |
| KR | 102451322 | B1 | 10/2022 |
| KR | 102469474 | B1 | 11/2022 |
| WO | 2017033874 | A1 | 3/2017 |

OTHER PUBLICATIONS

Jan Evler, Ehsan Asadi, Henning Preis, Hartmut Fricke, "Airline ground operations: Optimal schedule recovery with uncertain arrival times", Journal of Air Transport Management, vol. 92, 2021, Oct. 2021, ISSN 0969-6997, https://doi.org/10.1016/j.jairtraman.2021.102021. (Year: 2021).*

A Khosravi, S. Nahavandi and D. Creighton, "Estimating performance indexes of a baggage handling system using metamodels," 2009 IEEE International Conference on Industrial Technology, Churchill, VIC, Australia, 2009, pp. 1-6, doi: 10.1109/ICIT.2009.4939626. (Year: 2009).*

D. Hejji, M. A. Talib, A. B. Nassif, Q. Nasir and A. Bouridane, "AI-based Models for Resource Allocation and Resource Demand Forecasting Systems in Aviation: A Survey and Analytical Study," 2021 IEEE International Conference on Internet of Things and Intelligence Systems (IoTaIS), (Year: 2021).*

* cited by examiner

AUTOMATED STAFFING ALLOCATION AND SCHEDULING

BACKGROUND

The present disclosure relates to worker staffing and allocation and, more particularly, for predictively assigning baggage drivers to flights at an airport to reduce lost or delayed passenger baggage.

Airlines hire baggage drivers to drive baggage carts and to load baggage onto and/or unload baggage from aircraft operated by the airline. Passenger baggage can be improperly loaded or can fail to be loaded onto aircraft, resulting in delays in passengers receiving their baggage or resulting in passenger baggage becoming lost. Airlines can be financially liable for lost passenger baggage and, further, lost passenger baggage can result in decreased passenger satisfaction with the airline.

SUMMARY

An example of a method of automatically generating baggage driver staffing recommendations including receiving a first set of flight parameters for a first flight, creating a first predictive staffing model for the first flight by simulating missed bag quantities for a range of driver quantities using a first computer-implemented machine learning model and the first set of flight parameters, and automatically generating a first recommended driver quantity predicted to result in a quantity of missed bags using the first predictive staffing model and a threshold quantity of missed bags. The missed bag quantities are simulated using a simulator, the first computer-implemented machine learning model is configured to relate driver quantities and flight parameters to expected missed bag quantities, and the first predictive staffing model relates predicted quantities of missed bags to quantities of staffed drivers.

An example of a system includes a flight database, a processor, a user interface, and a memory. The memory is encoded with instructions that, when executed, cause the processor to receive a first set of flight parameters for a first flight, create a first predictive staffing model for the first flight by simulating missed bag quantities for a range of driver quantities using a first computer-implemented machine learning model and the first set of flight parameters, and automatically generate, using the first predictive staffing model and a threshold quantity of missed bags, a first recommended driver quantity predicted to result in a quantity of missed bags, wherein the first quantity of missed bags is not greater than the threshold quantity of missed bags. The instructions cause the processor to simulate missed bag quantities using a simulator. The first computer-implemented machine learning model is configured to relate driver quantities and flight parameters to expected missed bag quantities and the first predictive staffing model relates predicted quantities of missed bags to quantities of staffed drivers.

The present summary is provided only by way of example, and not limitation. Other aspects of the present disclosure will be appreciated in view of the entirety of the present disclosure, including the entire text, claims, and accompanying figures.

Figure 1:
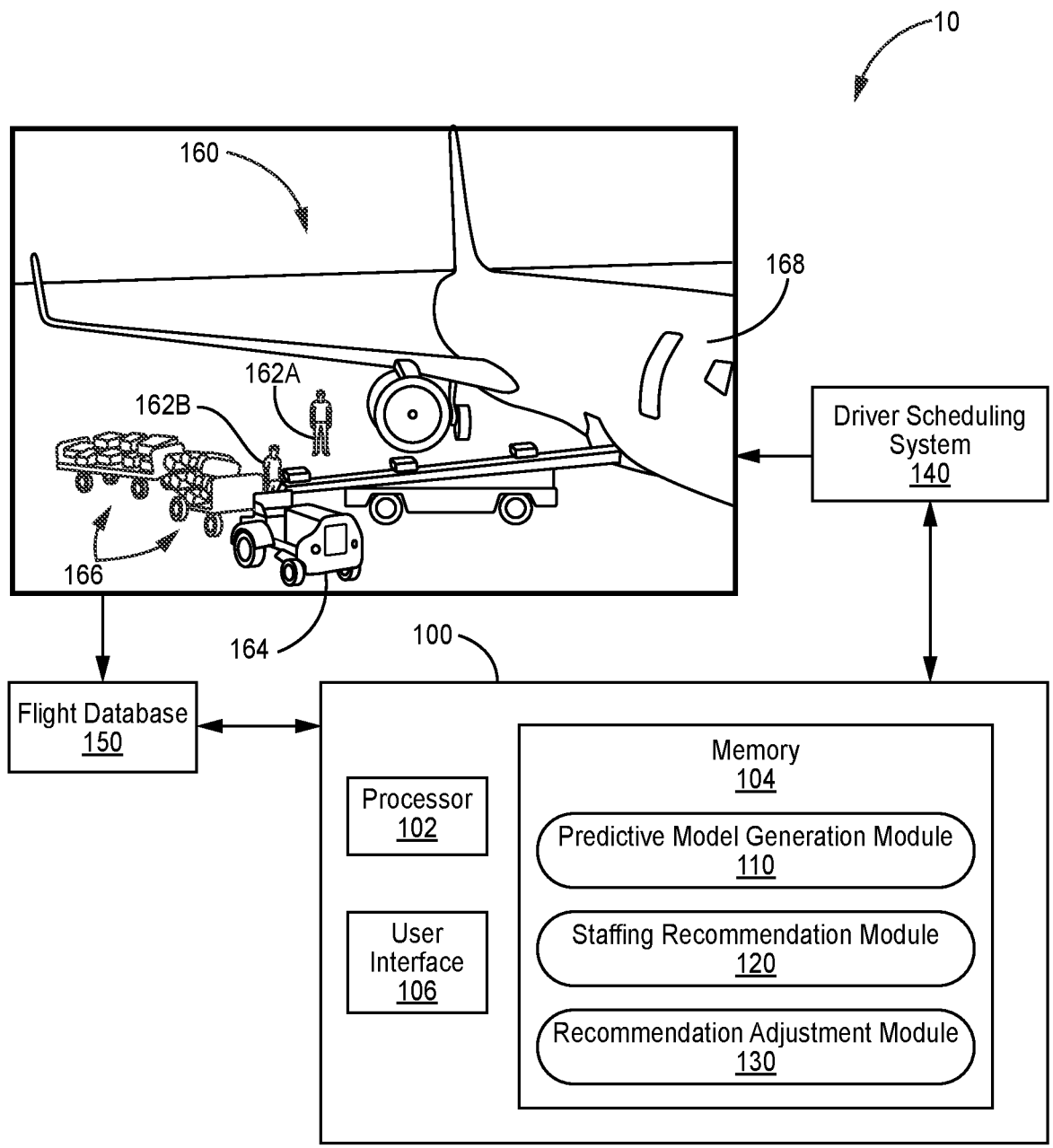
FIG. 1 is a schematic view of an example of a scheduling system for scheduling baggage drivers.

While the above-identified figures set forth one or more examples of the present disclosure, other examples are also contemplated, as noted in the discussion. In all cases, this disclosure presents the invention by way of representation and not limitation. It should be understood that numerous other modifications and examples can be devised by those skilled in the art, which fall within the scope and spirit of the principles of the invention. The figures may not be drawn to scale, and applications and examples of the present invention may include features and components not specifically shown in the drawings.

DETAILED DESCRIPTION

The present disclosure relates to systems and methods for generating baggage driver staffing recommendations. More specifically, the present disclosure relates to systems and methods for determining baggage driver quantities for individual flights that are expected to minimize the number of bags that are not loaded onto the proper departing flight. As referred to herein, a "missed bag" or "missed passenger bag" refers to a bag or other piece of luggage that is designated for loading onto a particular flight and is not properly loaded onto that flight. The systems and methods described herein use computer-implemented machine learning models to create predictive staffing models that, as will be explained in more detail subsequently, can be used to predict the number of bags that will missed at various baggage driver staffing levels. The systems and methods described herein can be use predictive staffing models to generate driver assignments for reducing the likelihood that a bag is missed.

Existing methods of allocating or assigning drivers to individual flights to load bags onto and/or unload bags from those flights are not able to create driver staffing levels that adequately reduce the number of bags that are missed or otherwise not properly loaded, and further are not able to create customized staffing models for individual flights. Conversely, the systems and methods described herein are able to create custom staffing models that represent the relationship between driver staffing and missed bag quantity for individual flights, enabling predictions regarding quantities of missed bags to be made based on the quantity of staffed drivers based on the relationship between driver staffing and missed bag quantity described by the predictive staffing model. Reducing the total number of missed bags can provide several business advantages to airlines operating at an airport. Reducing the total number of missed advantageously improves passenger satisfaction and reduces financial compensation to passengers for baggage that is undelivered and/or for which delivery is delayed, among other advantages.

The systems and methods described herein can also be used to compare recommended driver quantities to actual driver availability and to automatically make adjustments to recommended driver quantities based on that availability. More specifically, the systems and methods described herein can use the predictive staffing models to reduce or minimize the number of missed bags to adjust recommended driver quantities based on actual driver availability. The systems and methods described herein can further be used to create driver schedules to improve driver availability when drivers are assigned, and further to train computer-implemented machine learning models to generate predictive staffing models.

FIG. 1 is a schematic diagram of staffing system 10, which is an example of a system for scheduling baggage drivers. Staffing system 10 includes predictive scheduler 100, which includes processor 102, user interface 104, and user interface 106. Memory 104 includes predictive model generation module 110, staffing recommendation module 120, and recommendation adjustment module 130. Predictive scheduler 100 is connected to driver scheduling system 140 and flight database 150. Scheduling system 140 stores and generates scheduling information for airport 160, and, more specifically, for drivers 162A-B. Drivers 162A-B drive baggage cart 164 and/or handle baggage 166, and load baggage 166 onto aircraft 168.

Predictive scheduler 100 predicts relationships between missed bag quantities and driver quantities and uses those predicted relationships to create driver staffing recommendations for each flight at airport 160. The driver staffing recommendations created by predictive scheduler 100 reduce the incidence of missed bags at airport 160. As described previously, reducing the number of missed bags can provide a number of advantages for airlines operating at airport 160. Notably, reducing the number of missed bags can, for example, advantageously improve airline passenger satisfaction and reduce financial compensation that is due to passengers for baggage that is undelivered and/or for which delivery is delayed.

Processor 102 can execute software, applications, and/or programs stored on memory 104. Examples of processor 102 can include one or more of a processor, a microprocessor, a controller, a digital signal processor (DSP), an application specific integrated circuit (ASIC), a field-programmable gate array (FPGA), or other equivalent discrete or integrated logic circuitry. Processor 102 can be entirely or partially mounted on one or more circuit boards.

Memory 104 is configured to store information and, in some examples, can be described as a computer-readable storage medium. Memory 104, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 104 is a temporary memory. As used herein, a temporary memory refers to a memory having a primary purpose that is not long-term storage. Memory 104, in some examples, is described as volatile memory. As used herein, a volatile memory refers to a memory that that the memory does not maintain stored contents when power to the memory 104 is turned off. Examples of volatile memories can include random access memories (RAM), dynamic random access memories (DRAM), static random access memories (SRAM), and other forms of volatile memories. In some examples, the memory is used to store program instructions for execution by the processor. The memory, in one example, is used by software or applications running on predictive scheduler 100 (e.g., by a computer-implemented machine learning model or a data processing module) to temporarily store information during program execution.

Memory 104, in some examples, also includes one or more computer-readable storage media. Memory 104 can be configured to store larger amounts of information than volatile memory. Memory 104 can further be configured for long-term storage of information. In some examples, memory 104 includes non-volatile storage elements. Examples of such non-volatile storage elements can include, for example, magnetic hard discs, optical discs, floppy discs, flash memories, or forms of electrically programmable memories (EPROM) or electrically erasable and programmable (EEPROM) memories.

User interface 106 is an input and/or output device and enables an operator to control operation of predictive scheduler 100 and/or other components of staffing system 10 (e.g., driver scheduling system 140). For example, user interface 106 can be configured to receive inputs from an operator and/or provide outputs regarding driver quantity recommendations. User interface 106 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

As will be described in more detail subsequently, predictive scheduler 100 is configured to create predictive models that described expected numbers of missed passenger bags at various staffing levels. Predictive scheduler 100 is configured to query and retrieve driver staffing and scheduling information from driver scheduling system 140 and to train computer-implemented machine learning models using flight database 150. Predictive scheduler 100 uses one or more trained computer-implemented machine learning models to create predictive models. The predictive models created by predictive scheduler 100 can be used to determine staffing levels associated with a minimum number of missed bags and/or a number of missed bags at or below an acceptable threshold value of missed bags. Where the number of available baggage drivers is below the total number of recommended drivers associated with the minimum and/or sub-threshold value of missed bags, predictive scheduler 100 can use the predictive models to create staff allocations that are expected to minimize the total number of missed bags.

Predictive scheduler 100 can be a discrete assembly or be formed by one or more devices capable of individually or collectively implementing functionalities and generating and outputting data as discussed herein. In some examples, predictive scheduler 100 can be implemented as a plurality of discrete circuitry subassemblies. In some examples, predictive scheduler 100 can include or be implemented at least in part as a smartphone or tablet, among other options. In some examples, predictive scheduler 100 and/or user interface 106 of predictive scheduler 100 can include and/or be implemented as downloadable software in the form of a mobile application. The mobile application can be implemented on a computing device, such as a personal computer, tablet, or smartphone, among other suitable devices. Predictive scheduler 100 can be considered to form a single computing device even when distributed across multiple component devices.

Airport 160 is an airport from which one or more airplanes (e.g., aircraft 168) can arrive at and/or depart from. As referred to herein, a "flight" refers to the arrival or departure of an airplane from an airport (e.g., airport 160). As referred to herein, a "driver" is an employee and/or contractor of one or more airlines that manage and operate flights at airport 168, and drives baggage carts and loads baggage onto and/or off of airplanes. In the depicted example, there are two drivers 162A-B assigned to load baggage 164 onto aircraft 168. However, it is understood that the airlines that operate at airport 160 can engage in work any number of drivers for any number of flights. The quantity of drivers assigned to load baggage for a particular flight can be determined based on one or more characteristics of the flight. As will be explained in more detail subsequently, predictive scheduler 100 provides more accurate estimations of driver need than existing methods of driver scheduling, advantageously reducing the number of missed bags as compared to those existing methods.

Driver scheduling system 140 creates and manages the schedules of drivers at airport 160 (e.g., drivers 162A-B). Driver scheduling system 140 is configured both to create and manage work schedules for drivers at airport 160 and further to manage assigned driver quantities at airport 160. As referred to herein, a "work schedule" refers to the days and times of those days in which each driver is expected to be present for work at airport 160. As referred to herein, an "assigned driver quantity" or a "driver assignment quantity" refers to the quantity of drivers assigned to a particular flight at airport 100. Driver scheduling system 140 is in two-way communication with predictive scheduler 100 such that predictive scheduler 100 can query driver scheduling system 140 to determine available drivers at a particular point in time (e.g., drivers scheduled and present at the query time and/or drivers scheduled at a future time) and such that predictive scheduler 100 also automatically update assigned driver quantities stored on driver scheduling system 140 based on driver quantity recommendations created by predictive scheduler 100. Driver scheduling system 140 can also be used to assign individual drivers to flights based on the assigned driver quantities. More specifically, driver scheduling system 140 can store assigned driver quantity information for each flight as well as individual driver identity information, and can assign individual driver identities to each flight based on the assigned driver quantity for each flight.

In some examples, driver scheduling system 140 can create assigned driver quantities for all flights during particular time windows. The time window can be selected based on, for example, an expected time required to load baggage and/or unload baggage for a flight. In some examples, each window of time or time interval for which driver assignments are performed is referred to a "driver assignment window." In at least some examples, driver scheduling system 140 is a digital driver scheduling system implemented on one or more computing devices including a processor, a memory, and/or a user interface. The processor, memory, and/or user interface can be substantially similar to processor 102, memory 104, and user interface 106. The digital driver scheduling system can store driver schedules to, for example, the memory or another suitable storage device, and predictive scheduler 100 can be configured to access and/or modify the driver scheduling information stored by the digital driver scheduling system to the memory and/or other storage device. For example, in some of these examples where driver scheduling system 140 is a digital driver scheduling system, driver scheduling system 140 can be implemented on and maintained by predictive scheduler 100.

Flight database 150 stores historical flight parameter data from airport 160. In some examples, flight database 150 stores historical flight parameter data for a single airline at airport 160 or historical flight parameter data for flights at multiple airports for a single airline. Flight database 150 stores various flight parameters for a given flight, such as number of bags, ramp events, aircraft type, arrival station, departure station, time of day, day of week, flight type, number of connecting flights, number of delayed connecting flights, weather events, airport congestion, driver performance metrics, baggage routes, and bag descriptors, among other options.

As referred to herein, the "number of bags" refers to the total number of bags to be loaded onto a flight. As referred to herein, a "ramp event" refers to expected weather conditions and other predictable ground conditions that can impact baggage loading. As referred to herein, "aircraft type" refers to the make, model, and/or any other suitable aspect related to the structure and/or configuration of the aircraft for a particular flight. Also as referred to herein, "arrival station" and "departure station" refer to the position of aircraft at airport 160. The departure station refers to the location of the aircraft (e.g., aircraft 168) onto which baggage is loaded prior to departure of the aircraft. Arrival station refers to the position of an aircraft arriving at airport 160 from which bags are to be unloaded prior to being loaded onto the departing aircraft (i.e., the aircraft at the departing station). The relative positions of the arrival and departure stations can be particularly relevant in examples where some portion or all of the bags on the arriving aircraft are intended to transferred from the arriving aircraft to the departing aircraft, as will be described in more detail subsequently. In these examples, the flight parameters can also include gate distance. As referred to herein, "gate distance" refers to the distance between an arrival station and a departure station where bags are to be transferred from an arriving flight to a departing flight. The gate distance can be a linear distance between the gates. Additionally and/or alternatively, the gate distance can be distance that a driver is required to travel along pre-determined driver travel paths at airport 160 to reach the departure station from the arrival station. The total distance of the driver travel path can provide a more accurate representation of the distance between gates where drivers are required to take a non-linear path between gates to avoid, for example, an active runway.

As referred to herein, a "flight type" refers to various descriptors that describe the flight. The flight type can include, for example, whether the flight is a domestic or international flight. As referred to herein, the "number of connecting flights" refers to the number of flights that connect to the flight being analyzed. In some examples, the number of connecting flights can also refer to flights having one or more bags that need to be transferred from the connecting flight to the flight of interest. As referred to herein, the "number of delayed connecting flights" refers to the number of connecting flights that are delayed or are experiencing a delay. That is, the number of delayed connecting flights refers to the number of connecting flights that are arriving at a later time than originally scheduled. As used herein, "weather events" refer to one or more weather conditions present at airport 160. Weather events for the flight can be determined for the time bags are to be loaded and/or the departure time for the flight, among other options. As referred to herein, "airport congestion" refers to a value describing the current or expected congestion at airport 160. The airport congestion of airport 160 can be evaluated at, for example, the time bags are to be loaded and/or the departure time for the flight, among other options. Airport congestion can be represented as, for example, an overall number of planes at airport 160, a percentage of occupied gates, or another numerical value suitable for representing airport congestion at airport 160. Airport congestion can also be represented by, for example, one or more text descriptors (e.g., "high," "medium," or "low"). As referred to herein, "driver performance metrics" refer to one or more values that describe the performance of one or more drivers assigned to drive and/or load bags onto the flight. As referred to herein, "baggage routes" refer to the paths or routes at airport 160 that baggage carts (e.g., baggage cart 164) are permitted to use. The baggage routes can be influenced by, for example, the position of runways, the position of airplanes, or another suitable aspect of airport 160 that may influence the permitted pathways for baggage carts to travel. As referred to herein, "bag descriptors" refer to descriptors of bags to be loaded onto the flight. For example, the bag descriptor can include information about bag size, bag weight, or another suitable parameter for describing a bag. Bag descriptors for each bag to be loaded onto the flight can be stored to flight database 150.

Flight database 150 can deliver information to predictive scheduler 100 and/or predictive scheduler 100 can query and retrieve information from flight database 150. Predictive schedule 100 can use data from flight database 150 to, for example, train one or more computer-implemented machine learning models used by predictive model generation module 110. Predictive scheduler can also use data from flight database 150 to, for example, create predictive models for flights described by data stored in flight database 150. Flight database 150 can be any suitable queryable database for storing flight parameter information for flights at airport 160. Flight database 150 can also store the departure time of each flight, which can be used by predictive scheduler 100 to make driver recommendations for certain time windows or periods.

Predictive model generation module 110 includes one or more programs for generating predictive models for flights that describe expected numbers of missed bags across differing quantities of baggage drivers. Predictive model generation module 110 can query flight database 150 and receive flight parameter information for an upcoming flight. Predictive model generation module 110 can then generate a predictive staffing model for that upcoming flight using a computer-implemented machine learning model trained to create outputs of expected numbers or percentages of missed bags for varying quantities of staffed drivers. Specifically, predictive model generation module 110 can simulate various quantities of missed bags for each quantity of driver within a range of driver quantities, and can construct a predicting staffing model from the results of the simulation. The predictive staffing model describes an expected number or percentage of missed bags at different staffing levels. As will be explained in more detail subsequently, the predictive staffing models created by predictive model generation module 110 can be used by staffing recommendation module 120 to create driver quantity recommendations to minimize missed bags for each flight described by a predictive staffing model.

Predictive model generation module 110 can create a plurality or set of predictive models, where each predictive model describes a single flight at airport 160. More specifically, predictive model generation module 110 can perform simulations for each flight using the flight parameters for each flight in order to generate a predictive staffing model for each flight. The programs of predictive model generation module 110 can be run iteratively in the lead-up to a flight to allow the predictive models generated by predictive model generation module to be updated as flight conditions change. For example, due to a delay or another unexpected event, the aircraft type for a particular flight after the flight is originally scheduled but prior to departure. Updated flight parameter information can be delivered and stored to flight database 150 for the flight and a new predictive model can be created. The updated predictive model can be used by staffing recommendation module 120 to update staffing recommendations.

Staffing recommendation module 120 includes one or more programs for generating recommended driver quantities for one or more flights at airport 160 according to the predictive models generated by predictive model generation module 110. More specifically, staffing recommendation module 120 is configured to determine the minimum number of drivers associated with a number of missed bags below an acceptable threshold value of missed bags for each flight. The acceptable threshold value of missed bags can be, for example, zero missed bags. In other examples, the acceptable threshold value can be another value. The acceptable threshold value can also be expressed as a percentage of missed bags and computed for each flight. For example, the acceptable threshold value of missed bags can be 5% of the total number of bags, and the percentage value can be used to compute a quantity of missed bags that can be used as the threshold value on a flight-by-flight basis according to the total number of bags for each flight. In yet further examples, the models of predictive model generation module 110 can also associate driver staffing quantities with missed bag quantities as percentages of total missed bags, such that a threshold value expressed as a percentage can be directly compared with the models generated by predictive model generation module 110.

The recommended driver quantities generated by staffing recommendation module 120 can be used to assign drivers to each flight. More specifically, for each flight, staff scheduling system 140 can assign a quantity of drivers equal to or greater than the recommended driver quantity generate by staffing recommendation module 120. The recommended driver quantities generated by staffing recommendation module 120 can thereby be used to minimize the total number of missed bags for each flight at airport 160, providing the advantages of reducing the total number of missed bags described elsewhere herein. As described previously, staffing recommendation module 120 can automatically generate recommended quantities of assigned drivers for all flights within a driver assignment window. For example, driver scheduling system 140 can organize driver assignments into 45-minute intervals, and staffing recommendation module 120 can automatically generate recommended driver quantities for each flight within those 45-minute driver assignment windows. Driver scheduling system 140 can be configured to request recommended driver quantities from predictive scheduler 100 for each driver assignment window. Additionally and/or alternatively, staffing recommendation module 120 can be configured to automatically update the assigned driver quantities stored by driver scheduling system 140 based on the recommended minimum driver quantities for each flight.

Recommendation adjustment module 130 includes one or more programs for creating adjusted recommended driver quantities. Specifically, recommendation adjustment module 130 is configured to automatically update the recommended driver quantities created by staffing recommendation module 120 if the total number of recommended drivers for all flights at a particular point in time or during a particular driver assignment window is greater than the total number of available drivers. Where the total number of recommended drivers exceeds the total available number of drivers, recommendation adjustment module 130 can adjust the recommended drivers for each flight such that the total number of recommended drivers is less than or equal to (i.e., is not greater than) the total number of available drivers. Recommendation adjustment module 130 can use the predictive staffing models created by predictive model generation module to minimize or reduce the total number of mixed bags while ensuring that the total number of recommended drivers does not exceed the total number of available drivers. Recommendation adjustment module 130 can use the predictive staffing models for each flight to perform one or more optimizations, such as by one or more optimization functions, to determine a set of assigned driver quantities that produce a minimum number of missed bags across all flights using the total quantity of available drivers.

In some examples, predictive scheduler can also be used to create driver schedules. Advantageously, this can reduce the likelihood that the number of available drivers available at a particular point in time is less than the total recommended quantity of drivers for all flights at that time. The manner in which staffing recommendation module 120 can be used to create driver schedules is similar to the manner in which staffing recommendation module 120 can be used to create recommended assigned driver quantities, as described previously. Predictive model generation module 110 be used to generate predictive staffing models of all flights over a particular window of time. The predictive staffing models can be used by staffing recommendation module 120 to determine minimum total driver quantities required across all scheduled flights at airport 160 in order to maintain a particular acceptable or minimum threshold of expected missed bags. In this manner, predictive scheduler can function to forecast driver staffing demand across airport 160 associated with the acceptable or minimum threshold of expected missed bags. The forecasted driver demand can be automatically supplied to driver scheduling system 140 and driver scheduling system 140 can adjust and/or create driver schedules that staff a total number of drivers according to the predictions of predictive scheduler 100. In some examples, staffing recommendation module 120 can create recommended staff quantities in discrete time intervals to simplify scheduling performed by driver scheduling system 140. For example, staffing recommendation module 120 can be used to create recommended overall driver quantities for every 30-minute interval for a given day. In other examples, the interval can be 15 minutes, 45 minutes, 1 hour, 2 hours, or any other suitable interval for staffing. The time intervals of the scheduling recommendations created by staffing recommendation module 120 can be selected to match the size of the driver assignment window used by driver scheduling system 140 to assign drivers to. For example, if driver scheduling system 45-minute driver assignment windows, staffing recommendation module 120 can create recommended total driver quantities in the same 45-minute windows. In some examples, staffing recommendation module 120 includes one or more programs for automatically modifying the schedules of driver scheduling system 140 based on the recommended driver quantities generated by staffing recommendation module 120.

In some examples, unexpected events may change flight characteristics such that more drivers than anticipated are required to ensure that the total number of missed bags is below the acceptable threshold. For example, the number of bags for a flight may change, the aircraft type may change, or an unexpected ramp event (e.g., unexpected inclement weather) may occur, among other options. The programs of staffing recommendation module 120 can be run iteratively such that predictive scheduler can provide up-to-date recommended driver assignment quantities to driver scheduling system 140.

Further, in some examples where predictive scheduler 100 or another suitable system is used to generate driver schedules, changes to flight parameters from unexpected events can result in the scheduled number of employees being insufficient to provide a sub-threshold quantity of missed bags. In examples where changes to flight parameters are known sufficiently in advance of the relevant flight(s) to allow driver schedules to be altered, predictive scheduler 100 can automatically generate new recommended driver quantities and update driver schedules on driver scheduling system 140 according to the new recommendations. In examples where flight parameters are changed sufficiently close in time to the relevant flight(s) that employee schedules cannot be changed, predictive scheduler 100 can use the modules of recommendation adjustment module 130 to generate updated assigned driver quantities as described previously.

While system 100 has been generally described herein with respect to all bags to be loaded onto a flight, in some examples, system 100 can be adapted to reduce missed transfer bags. As referred to herein, a "transfer bag" that is offloaded from an arriving aircraft, driven to a departing aircraft different than the arriving aircraft, and loaded onto a departing aircraft. Transfer bags can be distinguished from non-transfer bags, which are not transferred onto another flight from an arriving aircraft and instead are returned to passengers via, e.g., a baggage claim. In at least some examples, transfer bags are more likely to be missed than non-transfer bags at airport 160. Accordingly, system 100 can be adapted to generate driver recommendations specifically for driving transfer bags from an arriving aircraft to a departing aircraft. Predictive model generation module 110 can be adapted to generate predictive models that relate numbers of available drivers for driving transfer bags to missed transfer bags, staffing recommendation module 120 can be adapted to generate a recommended number of drivers for driving transfer bags, and recommendation adjustment module 130 can be adapted to adjust recommended transfer bag drivers based on total available drivers for driving transfer bags. As described previously, the flight parameters used to create the predictive model for the departing flight can include the arrival station where system 100 is adapted to generate driver recommendations for driving transfer bags, such that the relative positions of the arriving and departing aircraft at the airport can be used to estimate the number of missed bags. Gate distance between the arriving and departing aircraft can also be used to estimate the number of missed bags. Further, the number of transfer bags as well as the number of non-transfer bags (i.e., bags originating at airport 160) can be used to create the predictive model for the departing flight.

Scheduling system 10, and in particular predictive scheduler 100, allows for the automatic creation of driver quantity recommendations for each flight at airport 160. Predictive scheduler 100 is able to generate predictive models for any number of flights occurring within any time window, and further to use those predictive models to improve driver staffing. As described previously, the driver staffing recommendations created using predictive scheduler 100 reduce the total number of missed bags at airport 160. Predictive scheduler 100 also enables the automatic reduction of recommended driver quantities where the total number of recommended drivers exceeds the available quantity of drivers. Further, predictive scheduler 100 uses predictive models created by predictive model generation module 100 to advantageously reduce recommended driver quantities in a manner predicted to reduce or minimize missed bags.

Although each of flight database 140, driver scheduling system 150, and predictive scheduler 100 are shown as individual components, in some examples, two or more of flight database 140, driver scheduling system 150, and predictive scheduler 100 can be integrated into a single system. For example, predictive scheduler 100 can store flight database 140 and/or driver scheduling system 150 to memory 104 or another storage device. Similarly, flight database 140 and driver scheduling system 150 can be integrated as a single device and/or system in some examples.

Figure 2:
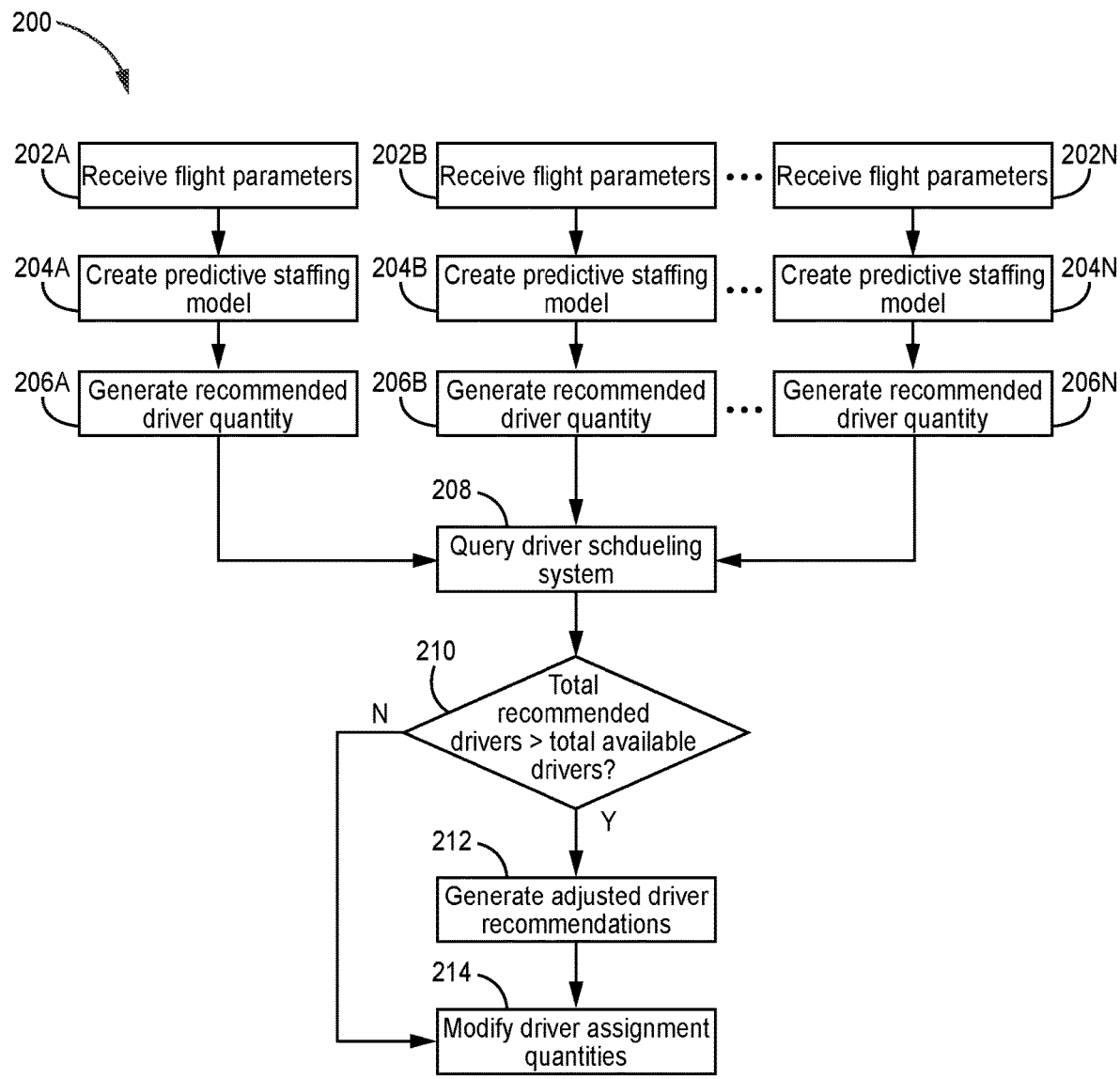
FIG. 2 is a flow diagram of an example of a method creating staffing recommendations using predictive staffing models.

FIG. 2 is a flow diagram of method 200, which is a method of creating staffing recommendations using predictive staffing models. Method 200 can be used to assign quantities of drivers to flights at airport 160 or any other suitable airport. Method 200 includes steps of receiving flight parameters (steps 202A-N), creating predictive staffing models (steps 204A-N), automatically generating recommended driver quantities (steps 206A-N), querying a driver scheduling system (step 208), determining whether the total recommended driver quantity is greater than the total available driver quantity, (step 210), generating an adjusted driver recommendation (step 212), and modifying driver assignments (step 214). Method 200 can be performed by the modules of predictive scheduler 100 and is be discussed herein with reference to predictive scheduler 100 and other components of scheduling system 10, but it is understood that method 200 can be performed by any suitable device and in any suitable system.

Steps 202-206 relate to the create of driver quantity recommendations for flights. One set of steps 202-206 is performed for each flight for which a recommended driver quantity is desired. In the depicted example, method 200 is depicted as including three separate sets of steps 202-206 (i.e., 202A-206A, 202B-206B, 202N-206N) for three flights at airport 160. However, in other examples, method 200 can be adapted to include any number of sets of steps 202-206 to create recommended driver quantities for any number of flights. Steps 202A-N are collectively referred to herein as "steps 202" or "step 202"; steps 204A-N are collectively referred to herein as "steps 204" or "step 204"; and steps 206A-N are collectively referred to herein as "steps 206" or "step 206."

In step 202, flight parameters for a particular flight are received. Predictive scheduler 100 can query flight database 150 to receive flight parameters for any and/or all flights described by data on flight database 150. Flight parameter information can be stored to, for example, memory 104 or another suitable memory device for further use with the steps of method 200. As described previously, the flight parameters received in step 202 can include ramp events, aircraft type, arrival station, departure station, time of day, and day of week, among other options. More generally, the flight parameters are descriptive of attributes of the aircraft onto which baggage will be loaded (e.g., aircraft type) and/or expected circumstances that may affect baggage loading (e.g., time of day).

In step 204, a predictive staffing model is generated for the flight for which flight parameters were received in step 202. Processor 102 can execute one or more programs of predictive model generation module 110 to generate the predictive staffing model. The predictive staffing model is generated by simulating the expected number or percentage of missed bags at differing numbers of drivers using a trained computer-implemented machine learning model and the flight parameters received in step 202. The trained computer-implemented machine learning model is configured to accept flight parameters and a quantity of drivers as an input, and further to output an expected number or percentage of missed bags. A range of drivers over which numbers of missed bags is simulated can be designated by, for example, a user (e.g., via user interface 106) or another program of predictive scheduler 100. The range can be based on an expected minimum and maximum number of drivers, and can include any suitable number of intermediate values. As a specific example, the range can be 1 to 30 drivers and all integer values therebetween. Processor 102 can use the simulator to simulate the expected number of missed bags for each value of drivers within the range, and store the results to memory 104 for use with further steps of method 200. The number of missed bags can be stored as, for example, a table or matrix that allows processor 102 to look up the number of missed bags for a given number of drivers.

In step 206, predictive scheduler 100 generates a recommended driver quantity for the flight based on the predictive staffing model generated in step 204. Processor 102 can use one or more programs of staffing recommendation module 120 to determine the minimum number of drivers that results in a number of missed bags below a threshold value of missed bags. The threshold number of missed bags can be determined by, for example, user input (e.g., at user interface 106) or by another program of predictive scheduler 100, among other options. The threshold value can be any suitable value. For example, the threshold value can be zero missed bags or a value equivalent to 5% of total bags on a given flight. Predictive scheduler can use the same threshold value for each flight or predictive scheduler 100 can use differing threshold values for each flight. For example, the threshold value for each flight can be encoded to flight database 150 and retrieved by predictive scheduler 100 for use with step 206 of method 200 by, for example, querying flight database 150.

The recommended driver quantity can be determined by comparing the missed bag quantities of the predictive staffing model generated in step 204 with the threshold value of missed bags, and by determining the lowest quantity of drivers that is expected to result in a number of missed bags that is less than or equal to the threshold value (i.e., not greater than the threshold value). The recommended driver quantity can then be stored to memory 104 or another suitable memory device for further use with subsequent steps of method 200.

In some examples, a maximum number of drivers can also be used to determine the recommended driver quantity in step 206. For example, for certain combinations of flight parameters, the recommended number of drivers can exceed the number of bags to be loaded onto the flight. In these examples, staffing recommendation module 120 can be configured to limit the recommended driver quantity generated in step 206. For example, the recommended driver quantity can be limited to be no greater than the total number of bags to be loaded. In some examples, staffing recommendation module 120 can be configured to create a recommended driver quantity that is no larger than the maximum driver quantity even where the maximum driver quantity is expected to result in, according to the predictive staffing model, a number of missed bags greater than the threshold value.

The flights for which steps 202-206 are performed are generally within the same assignment window or another suitable driver scheduling period, such that the total number of drivers available during the window or driver scheduling period can be compared to the total number of available drivers during that window or period, and further so that the assigned driver quantities recommended in steps 206A-N can be adjusted according to actual driver staffing levels. Further, the flights for which steps 202-206 are performed are generally scheduled to depart within a relatively short period of time after steps 202-206 are performed. For example, the flights can be scheduled to depart within 40 minutes of the performance of steps 202-206. In other examples, however, assigned driver quantities and/or driver assignments created according to method 200 can be for flights scheduled to occur at later time points. As a specific example, method 200 can adapted to assign drivers to a future date, such as the following calendar day.

In step 208, a driver scheduling system is queried to determine a maximum available number of drivers during the time period for which recommend driver quantities were created in steps 206A-N. The maximum number of available drivers determined in step 208 is generally the maximum number of available drivers at the time step 208 is performed, but some examples where assigned driver recommendations are generated for future time periods, the maximum number of available drivers determined in step 208 can be the maximum number of available drivers at the future time for which assigned driver recommendations were generated. Predictive scheduler 100 can query driver scheduling system 140 to determine a total number of available drivers. In other examples, the number of available drivers can be input by, for example, a user at user interface 106. The total number of available drivers represents the actual number of workers available to work as drivers and be assigned to flights for which assigned driver quantity recommendations were created in steps 206A-N.

In step 210, the total number of available drivers determined in step 208 is compared against the sum of the recommended driver quantities generated in steps 206A-N. If the total number of recommended drivers (i.e., the total of all drivers recommended in steps 206A-N) exceeds the maximum number of available drivers determined in step 208, method 200 proceeds to step 212. If the total number of recommended drivers generated in steps 206A-N does not exceed the maximum number of available drivers determined in step 208, method 200 proceeds to step 214.

In step 212, adjusted driver recommendations are generated. The adjusted driver recommendations are based on the driver recommendations generated in steps 206A-N, the predictive staffing models generated in steps 204A-N, and the total quantity of available drivers determined in step 208. Predictive scheduler 100 can generate the adjusted driver recommendations using the program(s) of recommendation adjustment module 130. More specifically, the predictive staffing models generated in steps 204A-N can be used to create flight assignments for the actual staffed drivers that minimize the expected number of missed bags.

Step 212 is performed to minimize the number of missed bags over the threshold value used in steps 206A-N when the actual number of drivers is less than the minimum total number of drivers expected to result in a predicted number of missed bags less than or equal to the threshold value. Step 212 optimizes recommended driver quantities using the predictive staffing models generated in steps 204A-N to reduce or minimize the number of missed bags across all affected flights. As one specific example, the recommended driver quantities can be adjusted by iteratively removing drivers until the total number of recommended drivers no longer exceeds the actual number of available drivers. More specifically, the predictive staffing model for each flight can be analyzed to determine the expected increase in the number of missed bags with one fewer driver. The recommended quantity of drivers for the flight corresponding to the minimum change in expected number of missed bags can be reduced by one (i.e., to reduce the quantity of assigned drivers to that flight) and the adjusted recommended driver quantity can be stored to memory 104. The predictive staffing models can then be analyzed based on the updated recommended driver quantities as described previously and the recommend driver quantity for the flight corresponding to the minimum change in the expected number of missed bags can be reduced by one. The flight can be the same flight or a different flight than the flight having a driver recommendation adjusted during the previous iteration. This process of adjusting driver quantities by analyzing the predictive staffing model for each flight can be repeated until the total number of recommended drivers resulting from the most-recent iteration is not greater than the total number of available drivers. This method of optimizing recommended driver quantities to minimize the number of missed bags is one example of an optimization strategy and, in other examples, other optimization strategies can be used to minimize the number of missed bags over the threshold value (i.e., the threshold value used in steps 206A-N).

In step 214, driver assignment quantities stored by the driver scheduling system are modified. Predictive scheduler 100 can modify driver assignment quantities maintained in driver scheduling system 140 based on the driver recommendations created in steps 206A-N and/or the adjusted driver recommendations created in step 212. One or more programs stored on memory 104 predictive scheduler 100, such as one or more programs of staffing recommendation module 120 and/or recommendation adjustment module 130 can automatically modify the driver assignment quantities stored by driver scheduling system 140 as new recommendations that do not exceed the total scheduled drivers are generated in steps 206A-N and/or step 212 of method 200. In other examples, a human operator can interact with, e.g., user interface 106 or another user interface configured to allow operation and/or modification of driver scheduling system 140 to update the driver assignment quantities stored by driver scheduling system 140.

The driver assignment quantities created in step 214 are driver quantities for each flight analyzed in steps 202-206. Driver scheduling system 140 can be used to assign drivers by identity to each flight according to the driver quantities created using method 200. As referred to herein, "assigning drivers" to a flight refers to the process of assigning individual driver identities to each flight. In some examples, predictive scheduler 100 can also modify the data of driver scheduling system 140 to assign individual drivers by identity according to the updated driver quantities created using method 200. In yet further examples, drivers can be assigned according to the recommendations created using method 200 by another program of driver scheduling system 140 or scheduling system 10. Driver assignments can also be performed manually by one or more users through, for example, input at user interface 106. Drivers can be assigned from a pool of available drivers and can be assigned according to the driver assignment quantities stored to driver scheduling system 140.

While method 200 has been described herein with respect to bags to be loaded onto a flight, in some examples, method 200 can adapted to reduce missed transfer bags. In at least some examples, transfer bags are more likely to be missed than non-transfer bags at airport 160. Accordingly, method 200 can be adapted to generate driver recommendations specifically for driving transfer bags from an arriving aircraft to a departing aircraft. Steps 204A-N can be performed to create predictive staffing models that relate number of drivers to expected numbers of missed transfer bags, and steps 206-214 can be performed substantially as described above to generate a recommended number of drivers for driving transfer bags (step 206), querying a driver scheduling system to determine the number of available drivers for driving transfer bags (step 208), comparing the total recommended drivers to the total available drivers (step 210), generating adjusted driver quantity recommendations (step 212), and modifying bag transfer driver assignment quantities (step 214). Similarly, the threshold missed bag value used in steps 206A-N can be a threshold value of missed transfer bags. As described previously, the flight parameters used to create predictive models in steps 204A-N can include the arrival station where method 200 is adapted to generate driver recommendations for driving transfer bags, such that the relative positions of the arriving and departing aircraft at the airport can be used to estimate the number of missed bags.

Advantageously, method 200 allows for the automatic creation of driver quantity recommendations for each flight at airport 160. The driver quantity recommendations created using method 200 enable a reduction in the total number of missed bags across all flights analyzed in steps 202-206 of method 200. The use of computer-implemented machine learning models to create predictive staffing models in steps 204A-N decreases the total time required to perform method 200 and create driver quantity recommendations, and also increases the accuracy of the driver quantity recommendations created using the predictive staffing models. Further, method 200 enables predictive scheduler to automatically check the feasibility of the driver recommendations created using staffing recommendation module 120 based on actual staffing levels, and to automatically adjust driver quantity recommendations to match actual staffing levels while reducing or minimizing adverse impacts on missed bags.

Figure 3:
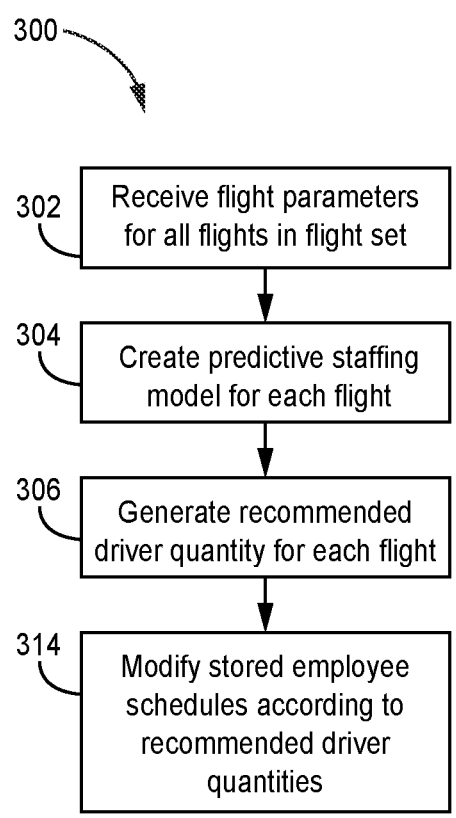
FIG. 3 is a flow diagram of an example of a method of creating driver work schedules using predictive staffing models.

As described previously, the predictive staffing models created in steps 204A-N of method 200 can also be used to create staff prospective schedules to improve the likelihood that the number of available drivers is not less than the total number of recommended drivers generated by steps 206A-N of method 200. FIG. 3 is a flow diagram of method 300, which is a method of creating work schedules using predictive staffing models. Method 300 can be used to create work schedules for drivers at airport 160 or any other suitable airport. Method 300 includes steps 302-314 of receiving flight parameters for all flights in a flight set (step 302), creating predictive staffing models for all flights in the flight set (step 304), generating recommended driver quantities for each flight in the flight set (step 306), and modifying employee schedules according to the recommended driver quantities (step 314). As will be explained in more detail subsequently, predictive scheduler 100 can perform methods 200 and 300 in tandem to create both driver schedules and recommended assignment quantities based on those schedules. As referred to herein, a "flight set" refers to at least one scheduled flight that is expected to occur during a particular departure window. The departure window is a period of time in which the scheduled flight(s) are scheduled to depart from the airport. The period of time can be any suitable length and can be selected to match existing groupings of flights maintained by an airline. The period of time can also be, for example, selected based on expected driver work hours, such that the driver schedules created by method 300 cover all flights occurring within the hours of a typical driver work shift. Method 300 can be used to create driver schedules for all flights within a flight set and provides the advantages of scheduling drivers with predictive staffing models described previously with respect to method 200.

Steps 302, 304, 306, and 314 are performed in substantially the same manner as steps 202, 204, 206, and 214 of method 200, described previously with respect to FIG. 2, except that steps 302-314 of method 300 are performed for all flights within a particular flight set rather than all flights occurring within a particular assignment window. Generally, the flight set used during method 300 includes a larger number of flights over a greater period of time than the number of flights within the assignment window for which driver recommendations are generated in method 200 (i.e., such that the departure window is greater than the assignment window).

In step 302, flight parameters are received for all flights within the flight set. Predictive scheduler 100 can query flight database 150 to receive flight parameters for all flights within the flight set. Predictive scheduler 100 can also use information stored to flight database 150 to determine which flights belong to the flight set. For example, predictive scheduler 100 can be configured to group all flights occurring within a particular time period as the flight set, and can be configured to query flight database 150 to receive flight parameters for all flights occurring within that time period.

In step 304, predictive models are generated for all flights within the flight set. Step 304 can be performed by, for example, one more programs of predictive model generation module 110. In step 306, the predictive models generated in step 304 are used to create recommended driver quantities for each flight. Step 306 is performed substantially as described previously with respect to step 206 of method 200 and can be performed by, for example, staffing recommendation module 120. In step 314, driver schedules are modified according to the recommended driver quantities generated in step 306. More specifically, predictive scheduler 100 can modify driver schedules of driver scheduling system 140 or cause driver scheduling system 140 to modify driver schedules according to the recommended driver quantities created in step 306. Additionally and/or alternatively, a human operator can use user interface 106 or another suitable user interface to modify driver schedules of driver scheduling system 140.

As described previously, in some examples, methods 200 and 300 can both be performed predictive scheduler 100. Advantageously, performing both methods 200 and 300 allows predictive scheduler to use predictive staffing models created by predictive model generation module 110 to both create staff schedules (method 300; FIG. 3) and to assign scheduled staff (method 200; FIG. 2). Further, methods 200 and 300 can be performed simultaneously, substantially simultaneously, and/or at differing time intervals. As a specific example, method 200 can be performed at the start of a new assignment window for all flights in the upcoming assignment window and/or for all flights stored to flight database 140 (i.e., all flights in the upcoming assignment window and all flights in assignment windows at later times than the upcoming assignment window). Method 300 can be performed at the same cadence as method 200, or can be performed at longer intervals. For example, method 300 can be performed once a day, while method 200 is performed several times throughout the day.

Figure 4:
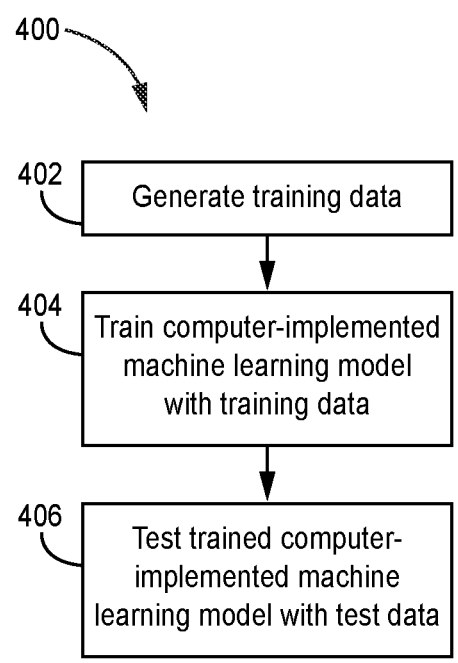
FIG. 4 is a flow diagram of an example of a method of a method of training a machine learning algorithm to create predictive staffing models for use with the methods of FIGS. 2 and 3.

FIG. 4 is a flow diagram of method 400, which is a method of training a machine learning algorithm to create predictive staffing models. Method 400 includes steps of generating training data (step 402), training the computer-implemented machine learning model with the training data (step 404), and testing the trained computer-implemented machine learning model with test data (step 406). Method 400 is a method of supervised learning that can be used to train any suitable computer-implemented machine learning model for use with methods 200 and/or 300 to create predictive staffing models that can be used to assign and schedule drivers to reduce and/or minimize missed passenger bags.

In step 402, the training data is generated. The training data is labeled historical flight data for various historical flights. For each flight, the labeled flight data includes a number drivers assigned to that flight and the number of missed bags, as well as various flight parameters expected to be available for use during performance of methods 200 and/or 300. The training data can be generated by analyzing historical flight data and extracting the number of drivers, the number of missed bags, and any desired flight parameters for each flight.

In step 404, the labeled data is used to train the computer-implemented machine learning model to predict numbers of missed bags based on driver quantities and flight parameters. As used herein, "training" a computer-implemented machine learning model refers to any process by which parameters, hyper parameters, weights, and/or any other value related model accuracy are adjusted to improve the fit of the computer-implemented machine learning model to the training data. The labeled data can be transformed by, for example, one or more programs and/or one or more other trained machine learning models before it is used for training in step 404.

In step 406, the trained computer-implemented machine learning model is tested with test data. The test data used in step 406 does not include numbers of missed bags, but otherwise is derived in substantially the same manner from historical flight data as the training data generated in step 402. Accordingly, the test data is unlabeled data that can be used to qualify and/or quantify performance of the trained computer-implemented machine learning model. More specifically, a human or machine operator can evaluate the performance of the machine learning model by evaluating the fit of the model to the test data. Step 406 can be used to determine, for example, whether the machine learning model was overfit to the labeled data during model training in step 404.

As depicted in FIG. 4, steps 404 and 406 can be performed iteratively to improve the performance of the machine learning model. More specifically, if the fit of the model to the unlabeled data determined in step 406 is undesirable, step 406 can be repeated to further adjust the parameters, hyper parameters, weights, etc. of the model to improve the fit of the model to the test data. Step 406 can then be repeated with a new set of unlabeled test data to determine how the adjusted model fits the new set of unlabeled test data. If the fit continues to be undesirable, further iterations of steps 404 and 406 can be performed until the fit of the model becomes desirable.

The trained computer-implemented machine learning models generated using method 400 can be used to create predictive staffing models in, for example, steps 204A-N of method 200 (FIG. 2) and/or step 304 of method 300 (FIG. 3). The predictive staffing models described herein advantageously allow for the simulation of expected missed bags at varying staffing levels, thereby enabling flights to be deliberately staffed to reduce expected missed bags. The use of computer-implemented machine learning models trained according to method 400 allows for the automatic creation of predictive staffing models over a relatively short period of time. For example, the use of computer-implemented machine learning models to create predictive staffing models in step 204A-N allows method 200 to be performed within a relatively short time period of when it is desirable to assign driver identities to each flight. As a specific example, the use of computer-implemented machine learning models allows method 200 to be performed substantially instantaneously or within another suitable time window (e.g., one minute) of when driver assignments are desired to be made. Advantageously, as it is possible for flight parameter information to change in the lead up to driver assignments, the use of computer-implemented machine learning models in method 200 allows for driver assignments to be made using substantially more accurate flight parameter information than methods requiring a longer lead time to create driver assignments. Further, the of computer-implemented machine learning models trained according to method 400 significantly improves the accuracy of driver staffing models produced in steps 204A-N of method 200 and/or step 304 of method 300.

The systems and methods disclosed herein advantageously allow for the training and use of machine learning models that can be used to create predictive models that are customized for individual flights and describe the relationships those individual flights between expected missed bag quantities and driver staffing quantities for driving and/or loading baggage. As described previously, the predictive staffing models and the recommendations based on those predictive models described herein provide numerous advantages over existing methods of driver staffing. Notably, the staffing recommendations based on the predictive models described herein lead to fewer missed bags than existing methods of driver staffing. As described previously, reducing the number of missed bags can provide a number of advantages to airlines operating one or more flights at an airport.

Further, the systems and method disclosed herein allow for those predictive staffing models to be used to create recommended driver quantities associated with an expected number of missed bags below a particular quantity (i.e., a threshold quantity). The systems and methods disclosed herein also can be used to adjust recommended driver quantities based on actual driver staffing levels, and can be used to create and modify driver work schedules such that actual driver staffing levels are likely to meet the recommended driver quantities created using the predictive staffing models.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the present disclosure.

The invention claimed is:

1. A method for automatically generating baggage driver staffing recommendations, the method comprising:
   receiving historical flight data describing a plurality of historical flights, the historical flight data comprising, for each flight of the plurality of historical flights, a historical driver quantity, a historical missed bag quantity, and historical flight parameters;

generating and labeling training data from a portion of the historical flight data and generating unlabeled test data from a remainder of the historical flight data;

iteratively training a computer-implemented machine learning model to generate a trained computer-implemented machine learning model configured to predict expected missed bag quantities based on driver quantities and flight parameters, wherein iteratively training the computer-implemented machine learning model comprises iteratively adjusting at least one parameter related to accuracy of the computer-implemented machine learning model based on the training data to iteratively adjust a fit of the computer-implemented machine learning model to the test data;

wherein iteratively adjusting includes:
testing the performance of the computer-implemented machine learning model to the test data to evaluate the fit of the model;
responsive to determining the fit is undesirable, further adjusting at least one parameter of the model to improve the fit; and
iteratively testing and adjusting until the fit of the model becomes desirable;

receiving flight parameters for a flight set, the flight set comprising a plurality of flights, and wherein each flight of the plurality of flights is scheduled to occur within a departure window;

generating a plurality of predictive staffing models by simulating missed bag quantities for a range of driver quantities using the trained computer-implemented machine learning model and the flight parameters, wherein each predictive staffing model relates predicted quantities of missed bags to quantities of staffed drivers for one flight of the plurality of flights;

automatically generating, using the plurality of predictive staffing models and a threshold quantity of missed bags, a plurality of recommended driver quantities, each recommended driver quantity corresponding to one flight of the plurality of flights and predicted to result in a quantity of missed bags not greater than the threshold quantity of missed bags;

generating a total recommended driver quantity based on the plurality of recommended driver quantities; and modifying electronic data representative of driver schedules during the departure window based on the total recommended driver quantity, the electronic data stored by an electronic driver scheduling system.

2. The method of claim 1, and further comprising:
querying the electronic driver scheduling system to determine a current available driver quantity, the current available driver quantity descriptive of a number of available baggage drivers at when the driver scheduling system is queried; and
determining whether the total recommended driver quantity is greater than the current available driver quantity.

3. The method of claim 1, and further comprising:
determining that the total recommended driver quantity is greater than the current available driver quantity; and
automatically generating an adjusted total recommended driver quantity by adjusting at least one recommended driver quantity of the plurality of recommended driver quantities using the plurality of predictive staffing models the threshold quantity of missed bags, and the current available driver quantity, wherein:

the at least one adjusted recommended driver quantity is predicted to result in a quantity of missed bags greater than the threshold quantity of missed bags;
the adjusted total recommended driver quantity is not greater than the current available driver quantity.

4. The method of claim 1, and further comprising:
assigning drivers from a pool of drivers to the plurality of flights based on the plurality of recommended driver quantities.

5. The method of claim 1, wherein:
the flights of the plurality of flights are scheduled to occur within an assignment window; and
the departure window describes a first period of time;
the assignment window describes a second period of time; and
the first period of time is greater than the second period of time.

6. The method of claim 3, wherein:
the historical flight data comprises, for each flight of the plurality of historical flights, a historical missed transfer bag quantity;
the trained computer-implemented machine learning model configured to predict expected missed transfer bag quantities based on driver quantities and flight parameters;
each predictive staffing model of the plurality of predictive staffing models is created by simulating missed transfer bag quantities for the range of driver quantities; and
the first quantity of missed bags is a first quantity missed transfer bags.

7. The method of claim 3, wherein the flight parameters include at least one of ramp events, aircraft type, departure station, time of day, day of week, flight type, a number of connecting flights, a number of delayed connecting flights, a weather event, airport congestion, a driver performance metric, a baggage route, and a baggage descriptor.

8. The method of claim 1, wherein the threshold quantity of missed bags is equal to five percent of a total number of bags for each flight of the plurality of flights.

9. A system comprising:
a flight database;
an electronic driver scheduling system storing electronic data representative of drive schedules;
a processor;
a user interface; and
a memory encoded with instructions that, when executed, cause the processor to:
receive historical flight data from the flight database, the historical flight data describing a plurality of historical flights and comprising, for each flight of the plurality of historical flights, a historical driver quantity, a historical missed bag quantity, and historical flight parameters;
generate and label training data from a portion of the historical flight data and generate unlabeled test data from a remainder of the historical flight data;
generate a trained computer-implemented machine learning model by iteratively adjusting at least one parameter related to accuracy of a computer-implemented machine learning model based on the training data to iteratively adjust a fit of the computer-implemented machine learning model to the test data, the trained computer-implemented machine learning model configured to predict expected missed bag quantities based on driver quantities and flight parameters;
wherein iteratively adjusting includes:

testing the performance of the computer-implemented machine learning model to the test data to evaluate the fit of the model;
responsive to determining the fit is undesirable, further adjusting at least one parameter of the model to improve the fit; and
iteratively testing and adjusting until the fit of the model becomes desirable;
receive flight parameters for a flight set from the flight database, the flight set comprising a plurality of flights, and wherein each flight of the plurality of flights is scheduled to occur within a departure window;
generate a plurality of predictive staffing models by simulating missed bag quantities for a range of driver quantities using the trained computer-implemented machine learning model and the flight parameters, wherein each predictive staffing model relates predicted quantities of missed bags to quantities of staffed drivers for one flight of the plurality of flights;
automatically generate, using the plurality of predictive staffing models and a threshold quantity of missed bags, a plurality of recommended driver quantities, each recommended driver quantity corresponding to one flight of the plurality of flights and predicted to result in a quantity of missed bags not greater than the threshold quantity of missed bags;
generate a total recommended driver quantity based on the plurality of recommended driver quantities; and
modify electronic data representative of driver schedules during the departure window based on the total recommended driver quantity, the electronic data stored by the electronic driver scheduling system.

10. The system of claim 9, wherein the instructions, when executed, further cause the processor to:
query the electronic driver scheduling system to determine a current available driver quantity, the current available driver quantity descriptive of a number of available baggage drivers at when the driver scheduling system is queried; and
determine whether the first total recommended driver quantity is greater than the current available driver quantity.

11. The system of claim 9, wherein the instructions, when executed, further cause the processor to:
query the electronic driver scheduling system to determine a current available driver quantity, the current available driver quantity descriptive of a number of available baggage drivers at when the driver scheduling system is queried;
determine that the total recommended driver quantity is greater than the current available driver quantity; and
automatically generate an adjusted total recommended driver quantity by adjusting at least one recommended driver quantity of the plurality of recommended driver quantities using the plurality of predictive staffing models, the threshold quantity of missed bags, and the current available driver quantity, wherein:
the at least one adjusted recommended driver quantity is predicted to result in a quantity of missed bags greater than the threshold quantity of missed bags;
the adjusted total recommended driver quantity is not greater than the current available driver quantity.

12. The system of claim 11, wherein the instructions, when executed, further cause the processor to:
assign drivers from a pool of drivers to the plurality of flights based on the plurality of recommended driver quantities.

13. The system of claim 11, wherein:
the historical flight data comprises, for each flight of the plurality of historical flights, a historical missed transfer bag quantity;
the trained computer-implemented machine learning model configured to predict expected missed transfer bag quantities based on driver quantities and flight parameters;
each predictive staffing model of the plurality of predictive staffing models is generated by simulating missed transfer bag quantities for the range of driver quantities; and
the threshold quantity of missed bags is a threshold quantity of missed transfer bags.

14. The system of claim 11, wherein the flight parameters include at least one of ramp events, aircraft type, departure station, time of day, day of week, flight type, a number of connecting flights, a number of delayed connecting flights, a weather event, airport congestion, a driver performance metric, a baggage route, and a baggage descriptor.

* * * * *